H. B. RUE.
WEED DESTROYING DEVICE.
APPLICATION FILED NOV. 6, 1917.
1,264,441.
Patented Apr. 30, 1918.
2 SHEETS—SHEET 1.
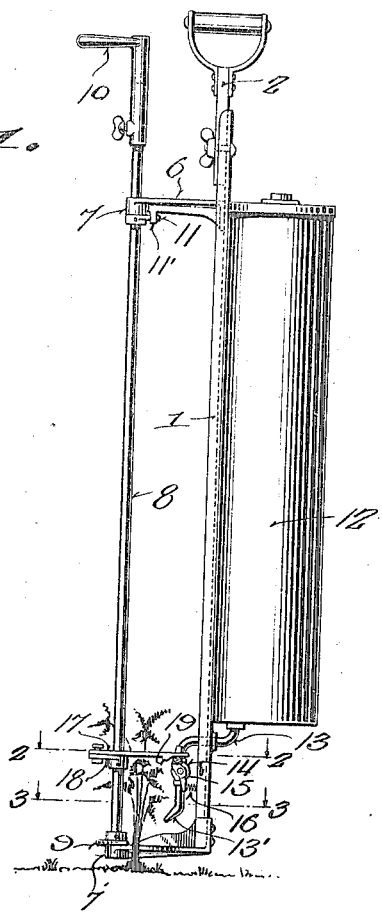
Fig. 1.
Fig. 2.
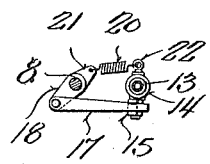
Fig. 3.
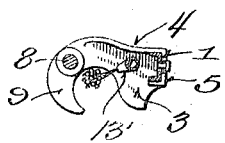

H. B. RUE.
WEED DESTROYING DEVICE.
APPLICATION FILED NOV. 6, 1917.
1,264,441.
Patented Apr. 30, 1918.
2 SHEETS—SHEET 2.
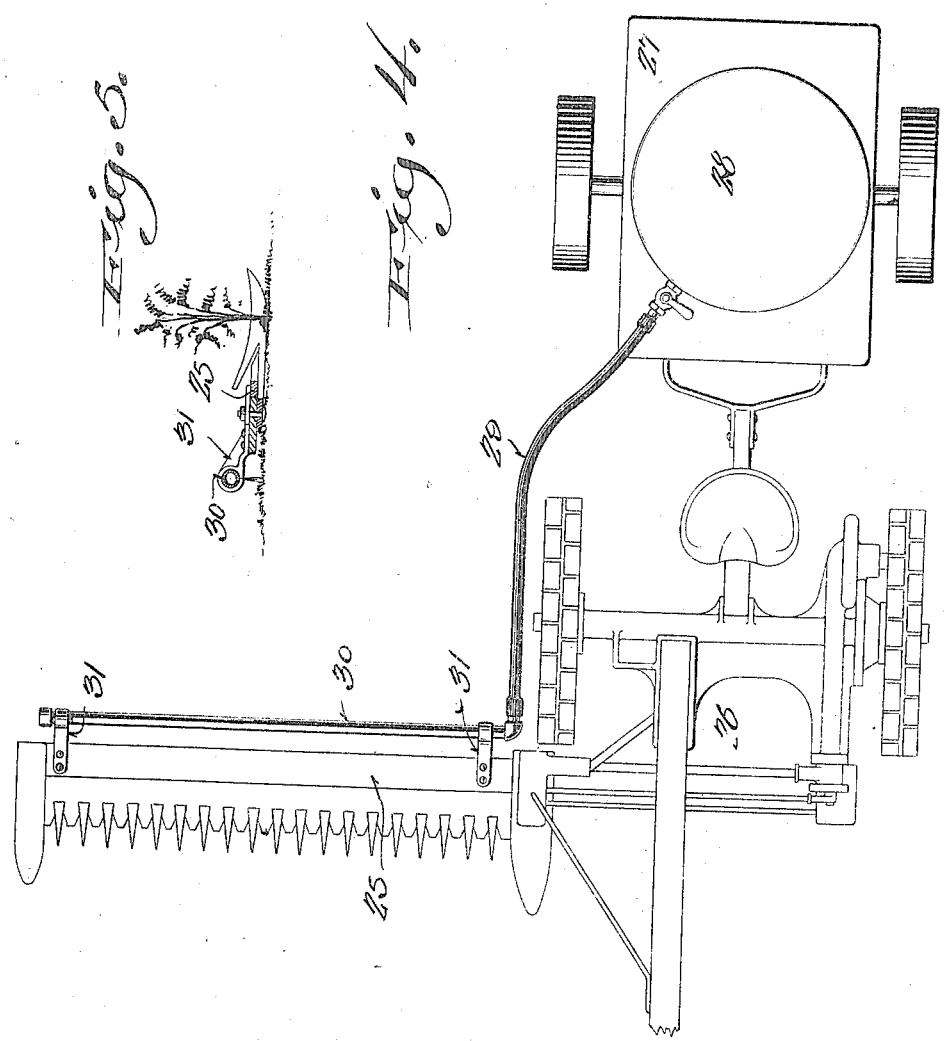

UNITED STATES PATENT OFFICE.

HARLEY B. RUE, OF MOUNT HOREB, WISCONSIN.

WEED-DESTROYING DEVICE.

1,264,441.  Specification of Letters Patent.  Patented Apr. 30, 1918.

Application filed November 6, 1917. Serial No. 200,522.

*To all whom it may concern:*

Be it known that I, HARLEY B. RUE, a citizen of the United States, and resident of Mount Horeb, in the county of Dane, and State of Wisconsin, have invented certain new and useful Improvements in Weed-Destroying Devices; and I do hereby declare that the following is a full, clear, and exact description thereof.

My invention relates to certain new and useful improvements in weed destroying or killing devices and has for its primary object to provide means for substantially simultaneously cutting the weeds from slightly above the ground and applying a weed killing substance to the remaining stalk.

With the above and other objects in view which will appear as the description proceeds, my invention resides in the novel construction, combination and arrangement of parts substantially as hereinafter described and more particularly defined by the appended claims, it being understood that changes in the precise embodiment of the herein disclosed invention may be made without departing from the spirit thereof.

In the accompanying drawings, I have illustrated one complete example of the physical embodiments of two forms of my invention constructed according to the best mode I have so far devised for the practical application of the principles thereof, and in which:

Figure 1 is a side plan view of one form of my invention.

Fig. 2 is a sectional view taken on the plane indicated by the line 2—2 of Fig. 1.

Fig. 3 is a sectional view taken on the plane indicated by the line 3—3 of Fig. 1.

Fig. 4 is a top plan view of a modified form of my invention, the essential parts thereof being shown in heavy shaded lines, and Fig. 5 is a view part in section and part in elevation showing the method of securing the spray pipe to the weed cutter.

Referring now to the accompanying drawings, and more particularly to Figs. 1, 2, and 3, 1 represents a channeled iron support adjustably carrying at its upper end a handle 2 and having secured to its lowermost end a shear plate 3 provided with a reinforced side portion 4 bent as at 5 to conform with the shape of support 1 whereby the shear plate is rigidly secured thereto. A bracket 6 is secured to support 1 near the upper end thereof and has formed on its outer end a bearing 7, the bore of which is in vertical alinement with the bore of a like bearing 7' formed on the outermost end of the shear plate 3.

Journally mounted in bearings 7 and 7' is a vertical rod 8, substantially parallel to support 1, having mounted thereon near its lower end a knife blade 9 co-acting with shear plate 3 to provide a cutting means, and detachably secured to the upper end thereof is an operating handle 10. As is obvious, upon the counter-clockwise movement of rod 8, by means of its handle 10, knife blade 9 will sever any weed disposed between it and shear plate 3, and for limiting the rotary movement of rod 8, a dog or lug 11 is secured to rod 8, near bearing 7, which is engageable with a stop 11' formed on the under side of bracket 6.

Upon the return of blade 9 to open position, a spray of any suitable weed killing substance is sprayed upon the severed stalk from a reservoir or container 12 mounted on support 1. An outlet 13 extends from the container 12 and has its spray mouth 13' disposed near shear plate 3 in such a position as to readily spray upon the severed stalk, as depicted in Figs. 1 and 3.

A valve 14 is disposed in outlet 13 and has mounted upon its stem, outward of its casing, a two armed lever 15, an expansile spring 16 engaging the lowermost arm of lever 15 and support 1 to normally retain the valve in closed position and the uppermost arm thereof being notched to receive the outer end of an operating link 17 which has its other end pivotally secured to a crank 18 fixed to rod 8. As best shown in Figs. 1 and 2 link 17 has formed on its under face a cam portion 19 which has its outer face inclined and its inner face abrupt.

As will be readily apparent, upon the cutting movement of blade 9, link 17 will be moved to the right of Fig. 1, cam 19 riding over the shoulder of the upper arm of lever 15 and upon the return movement of blade 9, the abrupt portion of cam 19 will engage the upper arm of lever 15 and open valve 14 against the action of spring 16. Upon the continued opening movement of blade 9, cam 19 will disengage the upper arm of lever 15 and spring 16 will return valve 14 to closed position. The return of blade 9 to opening position is accomplished by means of a retractile spring 20 having one end secured to a crank 21 fixed to rod 8 and to support 1 or as in the present instance to outlet 13 as at 22.

Referring now more particularly to Figs. 4 and 5, 25 designates the cutter bar of a suitable wheeled mower 26 and detachably secured to mower 26 is a wheeled truck 27 having mounted thereon a reservoir or container 28 which has leading therefrom a valve controlled flexible outlet 29 connected with a spray pipe 30 secured to the rear of cutter bar 25 by means of brackets 31.

In this form of my invention, a steady spray of the weed killing substance is played upon the severed stalks or weeds cut by the cutter 25 and in this manner the permanently destroying of obnoxious weeds is accomplished.

I claim:—

1. A device of the class described comprising a support, a weed killing substance container carried thereby, an operating rod journally carried by said support, cutting means carried by said operating rod, and means operable by said operating rod after each cutting operation for spraying the weed killing substance in said container.

2. A device of the class described comprising a support, vertically alined bearings carried by said support, a rod journaled in said bearings, a shear plate formed on the lowermost of said bearings, a knife blade carried by said rod and operable upon said shear plate to sever weeds, a reservoir carried by said support, a valve controlled outlet for said reservoir juxtaposed said shear plate and knife blade, and means operable by said rod upon its return movement to open said valve controlled outlet.

3. A device of the class described comprising a support, a rod journally carried by the support, a knife blade fixed to the rod and adapted to sever weeds when the latter is rotated in one direction, a reservoir carried by the support, a valve controlled outlet for said reservoir, and means for opening said valve controlled outlet, said means being operable by the rod when the same is rotated to return the knife blade to inactive position.

4. A device of the class described comprising a support, a knife blade carried by the support, operating means engaged with the blade to move the same in a cutting direction and to return the same to inactive position, a reservoir on the support, a valve controlled outlet for said reservoir, and an operating arm connected with the blade operating means to engage and open the valve controlled outlet when said means is moving the blade in one direction.

5. A device of the class described comprising a support, a knife blade carried by the support, operating means engaged with the blade to move the same in a cutting direction and to return the same to inactive position, a reservoir on the support, a valved outlet from the reservoir including a control lever, a spring engaging one end of the lever to hold the outlet closed, an operating link connected with the blade operating means, and a cam member on the link to engage the other end of the lever to open the outlet when the blade operating means is moved in one direction.

6. A device of the class described comprising a support, a rod journally carried by the support, a knife blade fixed to the rod and adapted to sever weeds when the latter is rotated in one direction, a reservoir carried by the support, a valved outlet for the reservoir including a control lever, a spring engaging one end of the lever to hold the outlet normally closed, a crank extending from said rod, an operating link pivoted to said crank, a cam member on the link to engage the other end of the lever, a second crank extending from the rod, and a spring connecting said second crank and the support, said spring being adapted to rotate said rod to return the knife blade to inactive position and simultaneously engage the active face of said cam member with the end of said lever to open the outlet from the reservoir.

In testimony that I claim the foregoing I have hereunto set my hand at Mount Horeb, in the county of Dane and State of Wisconsin.

HARLEY B. RUE.